(12) United States Patent
Faiman et al.

(10) Patent No.: US 9,471,605 B2
(45) Date of Patent: Oct. 18, 2016

(54) CONTACT RECOMMENDATION SYSTEM FOR A USER COMMUNICATION

(75) Inventors: Nathan G. Faiman, Rochester, MN (US); Michael T. Kalmbach, Elgin, MN (US); Brian R. Muras, Rochester, MN (US); Jared W. Patterson, Rochester, MN (US); Kevin Wendzel, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1038 days.

(21) Appl. No.: 13/164,951

(22) Filed: Jun. 21, 2011

(65) Prior Publication Data

US 2012/0330993 A1 Dec. 27, 2012

(51) Int. Cl.
*G06F 17/30* (2006.01)
*G06Q 10/10* (2012.01)

(52) U.S. Cl.
CPC ... *G06F 17/30286* (2013.01); *G06F 17/30675* (2013.01); *G06Q 10/107* (2013.01)

(58) Field of Classification Search
USPC .......................................................... 707/769
See application file for complete search history.

(56) References Cited

U.S. PATENT DOCUMENTS 7,802,191 B2 *  9/2010  Pettinati et al. ............. 715/739
8,041,560 B2 * 10/2011  Hermansen et al. ......... 704/10
2002/0156895 A1 * 10/2002  Brown ......................... 709/226
2005/0059418 A1 *  3/2005  Northcutt .................... 455/517
2006/0031772 A1 *  2/2006  Valeski ........................ 715/751
2009/0171904 A1 *  7/2009  O'Sullivan et al. ........... 707/3
2010/0299340 A1 * 11/2010  Murthy et al. ................ 707/759
2012/0225721 A1 *  9/2012  Holder et al. ................. 463/42

* cited by examiner

*Primary Examiner* — Joshua Bullock
(74) *Attorney, Agent, or Firm* — Patterson + Sheridan, LLP

(57) ABSTRACT

Techniques are described for allowing a first user to efficiently send contact information to a second user using a user communication of a messaging application such as email programs, instant messaging programs, social media websites, or chat rooms. The messaging application may maintain a name database that stores names that are relevant to a first user. When the first user then types or speaks a name into a user communication (e.g., an email, instant message, or voice message), the messaging application provides the first user with the names stored in the name database that match the name in the user communication. Additionally, the messaging application may use ranking data associated with each matched name to order the names according to relevance. The first user can then select the correct name (if there are multiple matched names) which prompts the messaging application to automatically send contact information to the intended recipient of the user communication either within the current user communication or in a separate communication. In this manner, the first user is able to efficiently send contact information of relevant names to a recipient. The recipient may then use the contact information to communicate with the suggested contact.

10 Claims, 8 Drawing Sheets

CONTACT RECOMMENDATION SYSTEM FOR A USER COMMUNICATION

BACKGROUND

1. Field of the Invention

Embodiments of the present invention generally relate to name suggestion in a messaging application. Specifically, the invention relates to transmitting contact information through a messaging application.

2. Description of the Related Art

Typical messaging applications allow two users to communicate in either real time or by using inboxes (e.g., email or social media websites). In some applications, each user has a list of trusted or approved contacts of other users who use the messaging application. However, current messaging applications do not have an easy process for sharing trusted contacts with other users. In some instances, a user must manually provide the name and contact information (e.g., a unique ID, a user name, or identifying information) to other users so that they may contact the person suggested by the user.

Currently, there is no convenient method of automatically displaying a list of potential contacts to the user so that the user can quickly send the contact information to other users.

SUMMARY

Embodiments of the invention provide a method, system and computer program product for recognizing an identifier in a user communication, where the identifier describes a person. The method, system and computer program identify at least two names in a name database based on the identifier and determine an order of the at least two names based on ranking data associated with each of the at least two names. The method, system and computer program transmit the at least two names to be displayed in the determined order and, after transmitting the ordered names, receive a selected name that is one of the ordered names. Finally, the method, system and computer program transmit contact information associated with the selected name.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
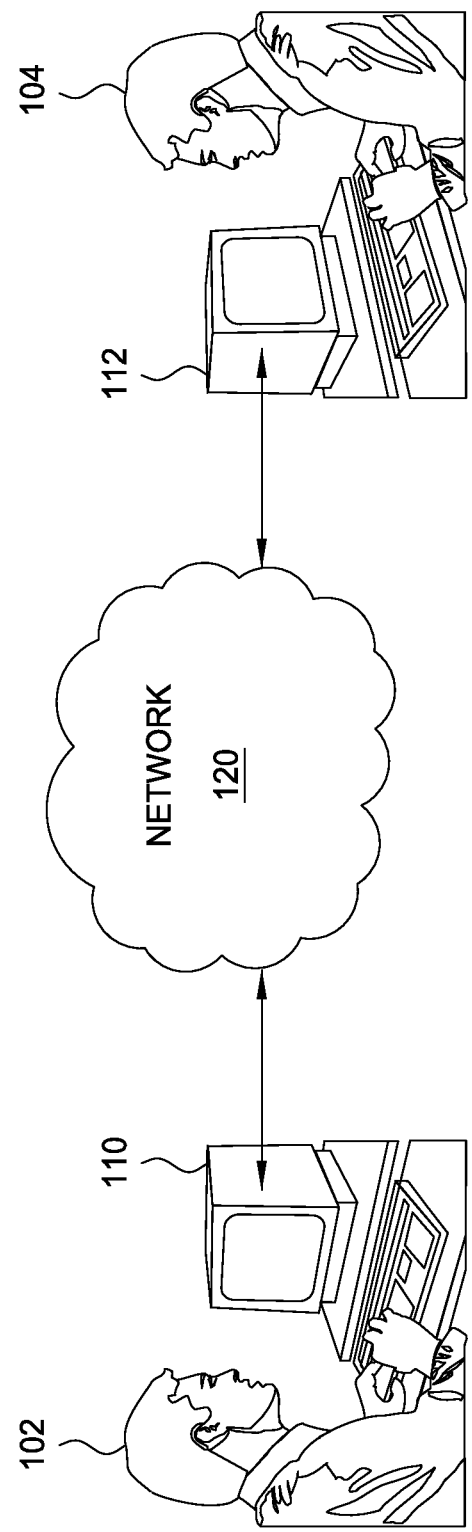
FIG. 1 illustrates a system for sending suggested contacts via a messaging application, according to embodiments of the invention.

A messaging application allows a user to communicate with a plurality of users in either real-time or by using inboxes. Messaging applications include email programs, instant messaging programs, social media websites, chat rooms, and the like. The messaging application may maintain a name database that stores names that are relevant to a first user. When the first user then types or speaks a name into a user communication (e.g., an email, instant message, or voice message), the messaging application provides the first user with the names stored in the name database that match the name in the user communication. Additionally, the messaging application may use ranking data associated with each matched name to order the names according to relevance. The first user can then select the correct name (if there are multiple matched names) which prompts the messaging application to automatically send contact information to the intended recipient of the user communication either within the current user communication or in a separate communication. Accordingly, the first user is able to efficiently send contact information of relevant names to a recipient. The recipient may then use the contact information to communicate with the suggested contact.

Moreover, the messaging application may order the matched names according to relevance before displaying the names to the first user. This ranking may be based on keywords, a predetermined score, or a position in an organizational hierarchy that is associated with each name stored in the name database. This may decrease the time necessary for the user to find and select the correct name from the list of matching names.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data (e.g., the name database) available in the cloud. For example, the messaging application could store the name database on a computing system in the cloud and use the cloud to access and maintain the database. In such a case, the messaging application could provide the matched names in a user communication and store updates to the name database at a storage location in the cloud. Doing so allows a user to access this information from any computing system attached to a network connected to the cloud (e.g., the Internet).

FIG. 1 illustrates a system for sending suggested contacts via a messaging application, according to embodiments of the invention. The system 100 includes a first computing system 110 used by a first user 102 and a second computing system 112 used by a second user 104. The first and second computing systems 110 and 112 may be connected by a network 120 which may be a wide area network (e.g., the Internet) or a local area network. In one embodiment, the first and second users 102, 104 may both use the same computing system and may not need the network 120 to share user communications. For example, the first user 102 may send a message that is later retrieved by the second user 104 on the same computing system.

In general, the first and second computing systems 110, 112 use a messaging application that permits the first and second users 102, 104 to communicate. In one embodiment, the first and second computing system 110, 112 use a portal, such as an Internet browser to access a messaging application that may be located remotely in the network 120 (e.g., on a server or in a cloud computing system).

Figure 2:
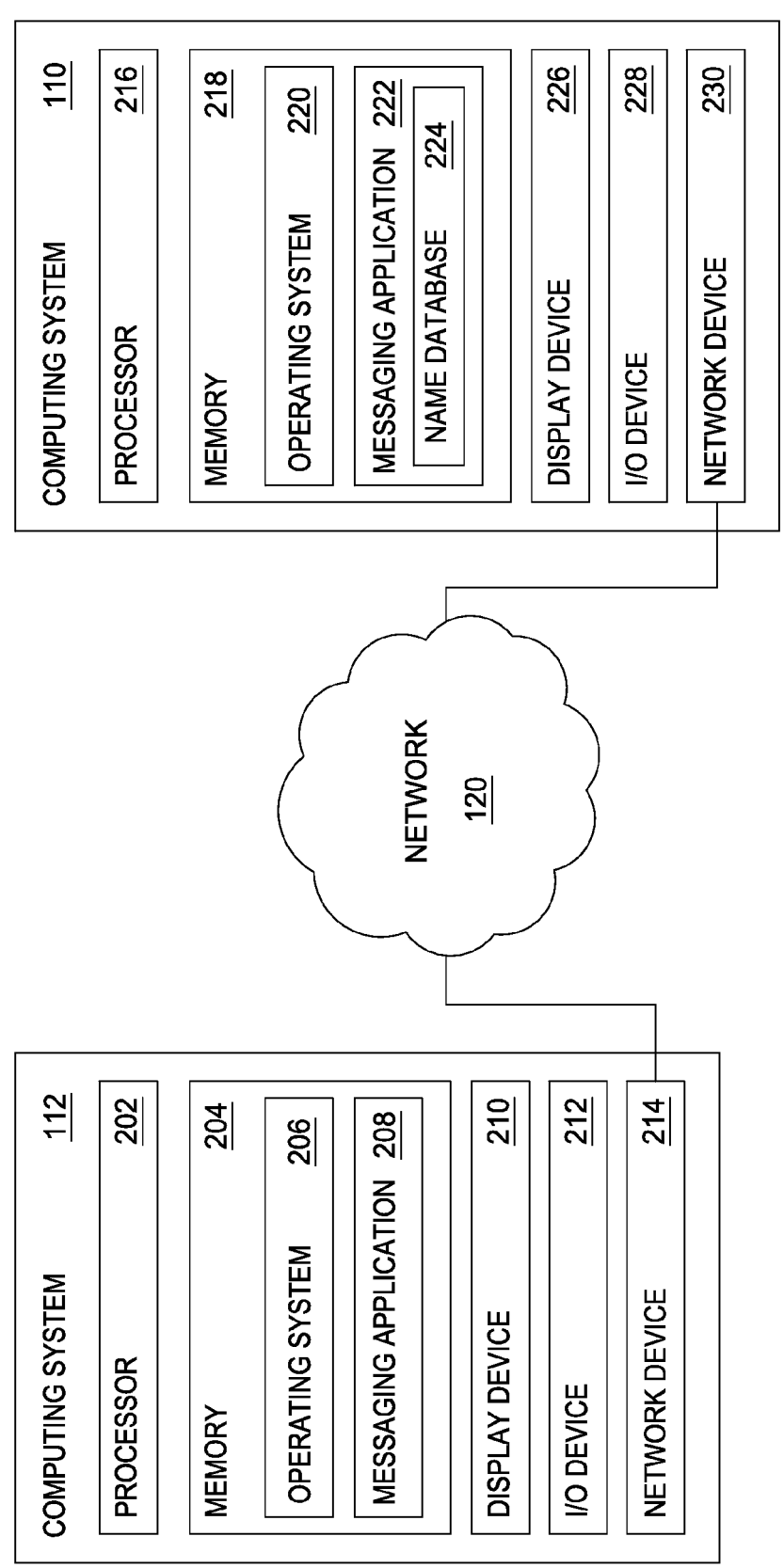
FIG. 2 is a block diagram of a system for sending suggested contacts via a messaging application, according to embodiments of the invention.

FIG. 2 is a block diagram of a system for sending suggested contacts via a messaging application, according to embodiments of the invention. The system 200 includes the first and second computing systems 110, 112 that have processors 202, 216, memories 204, 218, display devices 210, 226, I/O devices 212, 228, and network devices 214, 230. The processors 202, 216 may be any processors capable of performing the functions described herein. The memories 204, 218 could be one or a combination of memory devices, including Random Access Memory, nonvolatile memory, or backup memory (e.g., programmable or Flash memories, read-only memories, etc.). The memories 204, 218 include operating systems 206, 220, which may be any operating system known in the art, and the messaging applications 208, 222. The messaging application 222 includes a name database 224 that stores names that are relevant to the first user 102. The messaging application 222 gathers relevant names to populate the name database 224 from trusted or approved contact lists, names mentioned in previous user communications (e.g., chat logs or previous emails), names manually entered by a user, and the like. In one embodiment, the messaging applications 208, 222 are located remotely from the computing systems 110, 112, for example, in a cloud connected to the computing systems 110, 112 via the network 120.

The display devices 210, 226 may be a stand-alone monitor, such as an LCD or CRT monitor display, or a built-in display for a laptop computer, portable MP3 player, cell phone, tablet computer, or any other known or future device that may benefit from the process described herein. The I/O devices 212, 228 are any device that enables a user to interact with the computing systems 110, 112. Example I/O devices 212, 228 include mice, keyboards, motion sensors, eye-trackers, or scroll-balls. Moreover, the I/O devices 212, 228 and the display devices 210, 226 may not be directly connected to the computing systems 110, 112 but may use the network 120 (e.g., a LAN or WAN) to communicate with the respective computing system. The network devices 214, 230 allow the computing systems 110, 112 to communicate with the network 120.

Figure 3:
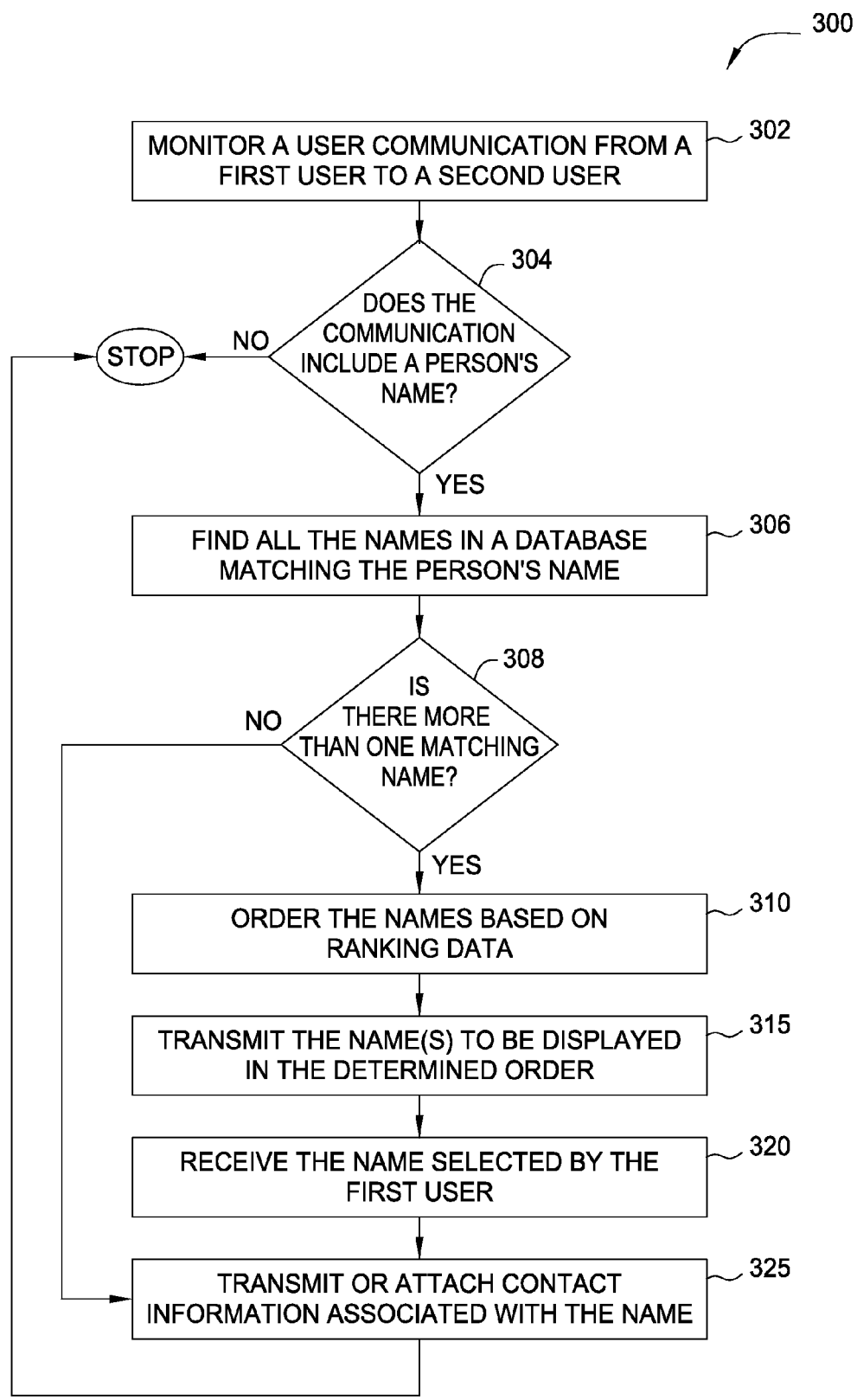
FIG. 3 illustrates a method of sending suggested contacts via a messaging application, according to embodiments of the invention.

FIG. 3 illustrates a method of sending suggested contacts via a messaging application, according to embodiments of the invention. In FIG. 3, it is assumed that the name database 224 has already been populated with at least two names. The flowchart starts at step 302 when the messaging application 222 begins to monitor a user communication from a first user 102 to a second user 104. A "user communication" may be any communication that receives input from the first user 102 that is intended for a second user 104. Moreover, a second user 104 could be a different account or alias used by the first user 102 in the messaging application 222. The user communication may occur in either real-time (e.g., a chat room) or use inboxes (e.g., an inbox for an email program or a social media website). In either case, a user communication may be text or a vocal recording which can be parsed by voice recognition software. Moreover, the messaging application 222 may monitor the user communication while the first user 102 is generating the message (i.e., while she is typing) or after the message is completed (i.e., when the first user 102 instructs the messaging application 222 to send the communication).

In one embodiment, the messaging application 222 may monitor all user communications—i.e., is not specific to a particular email or instant messaging program. In this manner, the messaging application 222 may monitor a plurality of different types of user communications used by the first user 102 and suggest contacts for each.

At step 304, the messaging application 222 determines if the user communication includes the name of a person (hereinafter an "identified name"). This may be only a first name, only a last name, only a middle name, or some combination of the three. In one embodiment, the messaging application 222 may be configured to recognize nick names or aliases. For example, the messaging application 222 may recognize that "Mom" and "Brother" are names that may have associated formal names stored in the name database 224.

If the messaging application 222 is dynamically or continually monitoring the user communication, then the messaging application 222 may wait until the first user 102 finishes a word before answering query 304. If the messaging application 222 is statically monitoring the user communication, then query 304 is answered only after the first user 102 finishes the communication. In one embodiment, the name database 224 may include a list of all known first and last names to aid the messaging application 222 when trying to identify names in a user communication. In another embodiment, the messaging application 222 may compare every word in the user communication to the relevant names stored in the name database 224 to determine a match (hereinafter "matched name(s)" or "matching names"). A person of ordinary skill in the art will recognize the methods that may be used to identify names in a user communication.

If the user communication includes a person's name, at step 306 the messaging application 222 searches the name database 224 to find all matching names. For example, the first user 102 may have typed only the name "Jim". In that case, any entries in the name database 224 that match "Jim" may be considered. In one embodiment, the name database 224 may have separate entries for first names and second names. Because "Jim" may be a common first name, the messaging application 222 may search only first name entries in the database. Moreover, the messaging application 222 may search for alternatives of identified names—e.g., "Jim" is short for "James", "Dick" for "Richard" or "Jon" for "Jonathan". For example, if the identified name is "Dick", matched names in the name database 224 may include "Richard", "Richard Smith", and "Dick Turner". The messaging application 222 may also consider common misspellings such as "Micheal" for "Michael".

In one embodiment, if the identified name is some combination of first, middle, and last names, then entries that include a portion of the identified name may still be a match. For example, if the identified name is "Jim Smith" then the match entries may include only the first name, i.e., "Jim". This may because the name database 224 has incomplete information. Accordingly, if the first user 102 selects "Jim" as the correct name, then the corresponding entry in the name database 224 may be updated so that "Jim" is now known to be "Jim Smith".

At step 308, the messaging application 222 determines if there is more than one matching entry in the name database 224. The messaging application 222 may find a matched entry by any of the methods described above, which may include entries that are exactly the same. That is, each name entry in the name database 224 does not need to be unique. For example, because "Jim Smith" is a common name, there may be multiple entries in the name database 224 with the name "Jim Smith" that represent separate individuals. The messaging application 222 may consider these similar entries as separate matches when parsing the name database 224.

If there are multiple entries in the name database 224 that match the identified name, at step 310 the messaging application 222 may order the matched names based on ranking data associated with each entry. Ranking data may be keywords, a person's position in a structured hierarchy (e.g., a supervisor in a business organization), a predetermined score, the frequency a name is selected by the first user 102, length of time the name has been stored in the name database, helpfulness of the person based on past interaction, or some weighted combination of these types of information. Ranking data may permit the messaging application 222 to differentiate between name entries that are exactly alike. For example, one "Jim Smith" may be an engineer (e.g., an associated keyword) while a second "Jim Smith" is a doctor. These associated keywords distinguish between the two name entries.

In general, keywords may be associated with each entry or name stored in the name database 224. Specifically, the name database 224 can store the name and any associated keywords on the same row of a table in a relational database. Alternatively, the system 200 could include a separate keyword database that has pointers to the associated name stored in the name database 224. A person of ordinary skill will recognize the different methods of storing name entries and associated keywords.

The messaging application 222 may associate keywords with names stored in the name database 224 in a variety of ways. In one embodiment, the keywords are found from a trusted contact list, past communications with the person (e.g., chat logs), current communications with the person, or a biography or profile associated with the person. For example, many social media websites allow a user to create a profile that may include the user's occupation, education, physical characteristics, location, and the like. Accordingly, the messaging application 222 may use the user's profile to identify keywords that are then associated with the person's name stored in the name database 224. In one embodiment, the messaging application 222 may prompt or allow the first user 102 to provide keywords associated with a name stored in the name database 224.

The messaging application 222 may also discover and associate keywords with the identified names in the user communication. Specifically, the messaging application 222 may parse the user communication to find keywords that describe the identified names. These keywords may then be compared to the keywords associated with the matched names. In one embodiment, the greater the similarities between keywords, the greater the score assigned to the matched name. Accordingly, by comparing keywords associated with the identified names with keywords associated with the matched names, the messaging application 222 may rank the matched names.

The ranking data may be based on an organization's hierarchy. For example, a business may employ people with the titles ranging from intern to CEO. Accordingly, the messaging application 222 may order matched names according to the hierarchy of the organization—e.g., a permanent employee is ranked higher than a temporary employee. Alternatively, a matched name is ordered higher if the title of the matched name is the same or similar as the title of the first user 102. In another embodiment, employees may be grouped according to specialized practice groups. A matched name for an employee that is in the same practice group as the first user 102 is likely to be relevant to the first user's conversation, and thus, may be placed higher in the order.

The ranking data may be based on a predetermined score. A predetermined score is a value that is assigned to a name in the name database 224 before the messaging application 222 orders the matched names. The messaging application 222 then uses the predetermined score to order matched names (e.g., the highest score appears at the top of an ordered list). The first user 102 may assign a predetermined score to each name or entry in the name database 224. The score may then increase or decrease based on further user input, for example, if the first user 102 later selects the associated name as a matched name.

The ranking data may be based on a frequency the name appears in the first user's 102 communications. For example, the messaging application 222 may increase a score assigned to an entry in the name database 224 each time the entry appears in a communication. Moreover, the messaging application 222 may increase the score by a greater value if the matched name is then selected by the user. Conversely, the score may decrease after a predetermined period of time if the name entry is not matched to an identified name. For example, the score associated with the name entry may decrease by a certain value each time the predetermined period of time expires without the name matching an identified name. In this manner, infrequently used names in the name database 224 may be given less weight. In one embodiment, the messaging application 222 may establish a threshold that if a score falls below, the name is erased from the name database 224.

The ranking data may be based on the length of time the name database 224 has stored a name. That is, the messaging application 222 may associate a timer or timestamp with the new entry that defines a predetermined time to store the name in the name database 224. After that time expires, the name may be expelled. In another embodiment, the entry may be assigned a lesser weight as time continues. That is, a name that has been stored for over a year may be less relevant than a name that was recently added to the name database 224. In addition, the messaging application 222 may reset the timer or timestamp if the ranking data associated with the name is updated.

Figure 4:
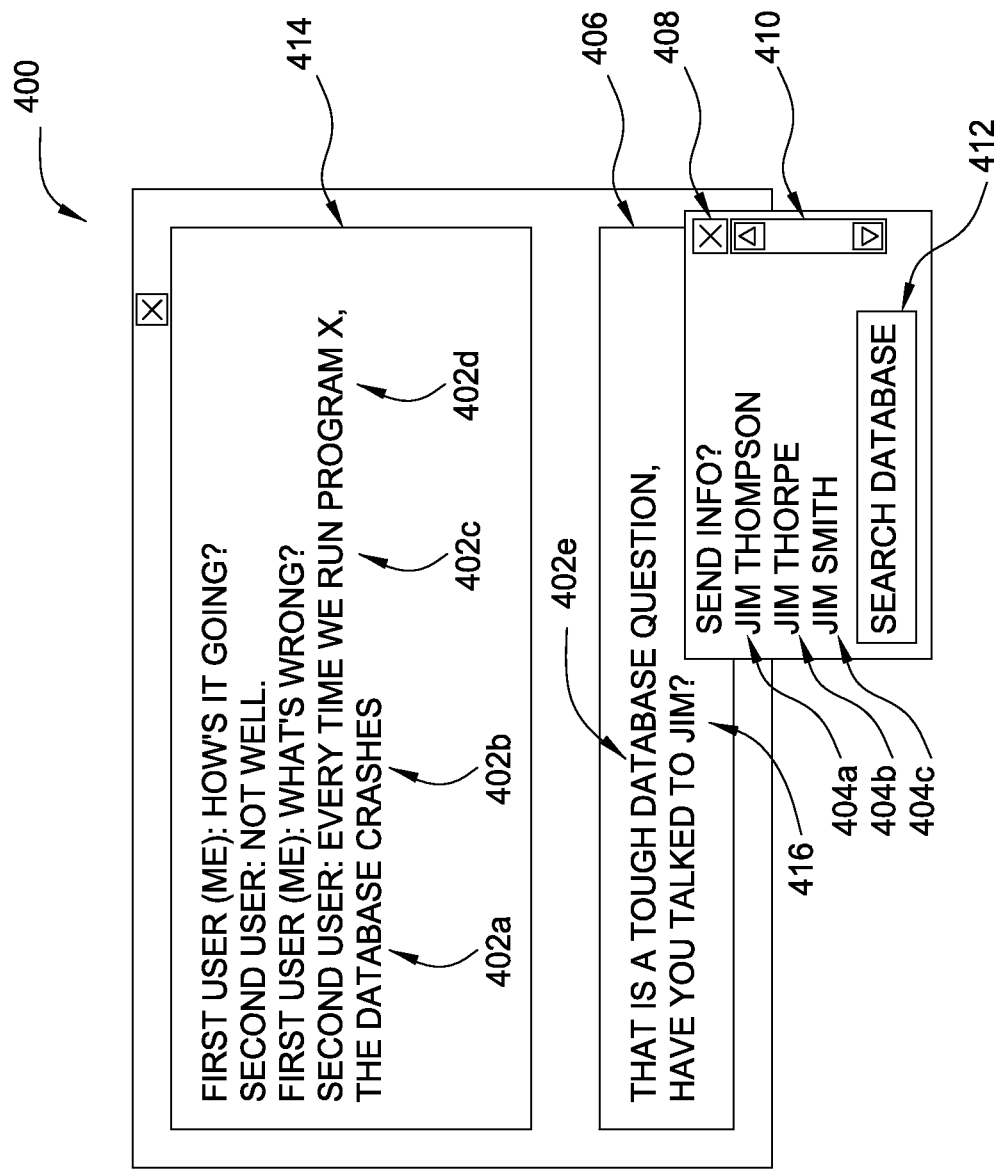
FIG. 4 illustrate a messaging application window that suggests contacts to a user, according to embodiments of the invention.

The ranking data may be based on a helpfulness of the person with the identified name. As shown in FIG. 4, the first user 102 is attempting to refer a person—Jim 416—to the second user 104 to help with a database question. The matched names 404 may be ranked whether the person helped a recipient of previous user communications. That is, Jim Thompson 404a was more helpful to a second user 104 than Jim Smith 404c during previous user communications and is thus ranked higher. Similarly, the matched names 404 may be ranked based on reputation that may be assigned by two or more users of the messaging application 222. For example, if a plurality of users informs the messaging application 222 that Jim Thompson 404a is more helpful at answering questions than Jim Smith 404c, then Jim Thompson 404a may be ranked higher.

In one embodiment, the ranking data may be a combination of the types of ranking data identified above. Additionally, each type may be weighted differently. The messaging application 222 may establish a total score that assigns a percentage to each type of ranking data used. Based on the total score given to each matched name, the messaging application 222 determines an order for the matched names.

At step 315, the messaging application 222 transmits the ordered matched names to a display device 226. The first user 102 may then view the ordered matched names and use an I/O device 228 to select the correct name of the matched names (hereinafter the "selected name").

In one embodiment, the first user 102 may decide not to select a name. This may occur if the first user does not want to send contact information to the second user 104 or the correct name is not shown in the matched name. In either case the messaging application 222 may permit the user to close the displayed list or continue to display the list until, for example, a timer expires, another identified name is detected, or the first user 102 sends the user communication. In one embodiment, the messaging application 222 may permit the user to manually search the name database 224 or add the correct name and any associated ranking data to the name database 224.

FIG. 4 illustrate a messaging application window that suggests contacts to a user, according to embodiments of the invention. The window 400 is an example of graphical user interface generated by the messaging application 222 for a display device 226. The window 400 includes a chat log 414 of previous messages shared between the first and second users 102, 104, a current user communication 406, and an ordered list 410 of matched names 404. The chat log 414 and user communication 406 each contain keywords that may be used to compare with ranking data to order the matched names 404.

The ordered list 410 also includes a close button 408 and a search button 412. The close button 408 permits the first user 102 to remove the ordered list 410 from the window 400 if, for example, the first user 102 does not want to send contact information of the identified name 416 to the second user 102. As mentioned previously, the messaging application 222 may remove the ordered list 410 without a prompt from the user after a timer expires or the first user 102 sends the user communication 406. The search button 412 may grant the first user 102 access to the name database 224 to manually search for additional names. In one embodiment, the search button 412 is a link that activates a separate GUI for the first user 102 to parse the name database 224 by any method known in the art.

Once the first user 102 selects one of the matched names 404, the ordered list 408 may close and the selected name is transmitted to the messaging application 222 (if the messaging application 222 is not directly controlling the display of the window 400).

In one embodiment, the messaging application 222 may dynamically change the ordered list 404 as more information is provided in the user communication 406. The first user 102 may type in a last name for the identified name 416 which may spur the messaging application 222 to reevaluate the matched names 404 to determine if the names 404 still match the identified name. In another embodiment, the first user 102 may type in further keywords 402 that better match any keywords associated with the matched names 404. Accordingly, the messaging application 222 may change the order of the matched names 404 to reflect the new information. Matching keywords in the user communication to keywords associated with matched names 404 will be discussed in greater detail below.

Although FIG. 4 is a GUI for an instant messaging application, the discussed methods are not limited to such. Instead, the same functions may be applied to an email program, a social media website that permits user communications, or a chat room hosted by a remote server.

Returning to the flowchart of FIG. 3, at step 325 the messaging application 222 sends contact information associated with the selected name to the second user 104. In general, the contact information is any information that permits the second user 104 to contact the person with the selected name in either the real-world or within the messaging application 222. The contact information may be a link to the profile associated with the identified name, a vCard or electronic business card, an email address, a unique user ID, a telephone number, an address, and the like. In one embodiment, the messaging application 222 may insert the contact information into the user communication 406 directly or generate metadata associated with the communication 406. Once the first user 102 sends the user communication 406, the attached contact information is sent also. If the user communication includes embedded metadata, after the second user receives the user communication 406, in one embodiment, moving a graphical marker of the I/O device 212 (e.g., a mouse cursor) over the identified name 416 displays the associated contact information.

In another embodiment, the messaging application 222 may transmit the contact information to the second user 104 separate from the user communication 406. For example, the messaging application 222 may generate a second user communication or automatically cause the contact information to be displayed on the display device 210 once the second user 104 accesses the messaging application 222. After the first user 102 selects the correct name from the ordered list, the messaging application 222 either attaches or transmits the contact information without further instruction from the first user 102.

In one embodiment, the messaging application 222 automatically performs the method 300 when monitoring the user communications from the first user to the second user. For example, the second user may send a request to be added to the approved contact list of the first user. If the first user accepts the request, the messaging application 222 automatically performs the method 300 on any user communications going from the first user to the second user. The first user may then customize the messaging application 222 by deactivating the method 300 for user communications that are intended for certain users on the approved contact list. Alternatively, the messaging application 222 may perform the method 300 on all user communications regardless of whether the users are on a trusted contact list.

Returning to step 308, if there is only one matched name, the messaging application 222 may immediately transmit the contact information to the second user 104 or attach the contact information to a user communication 406. Alternatively, the messaging application 222 may still display the single matched name in a GUI like that shown by FIG. 4. Doing so permits the first user 102 to select whether to send the contact information or not. For example, the matched name might not be correct, or the first user 102 might not want to the second user 104 to receive the contact information.

Populating a Name Database

Figure 5:
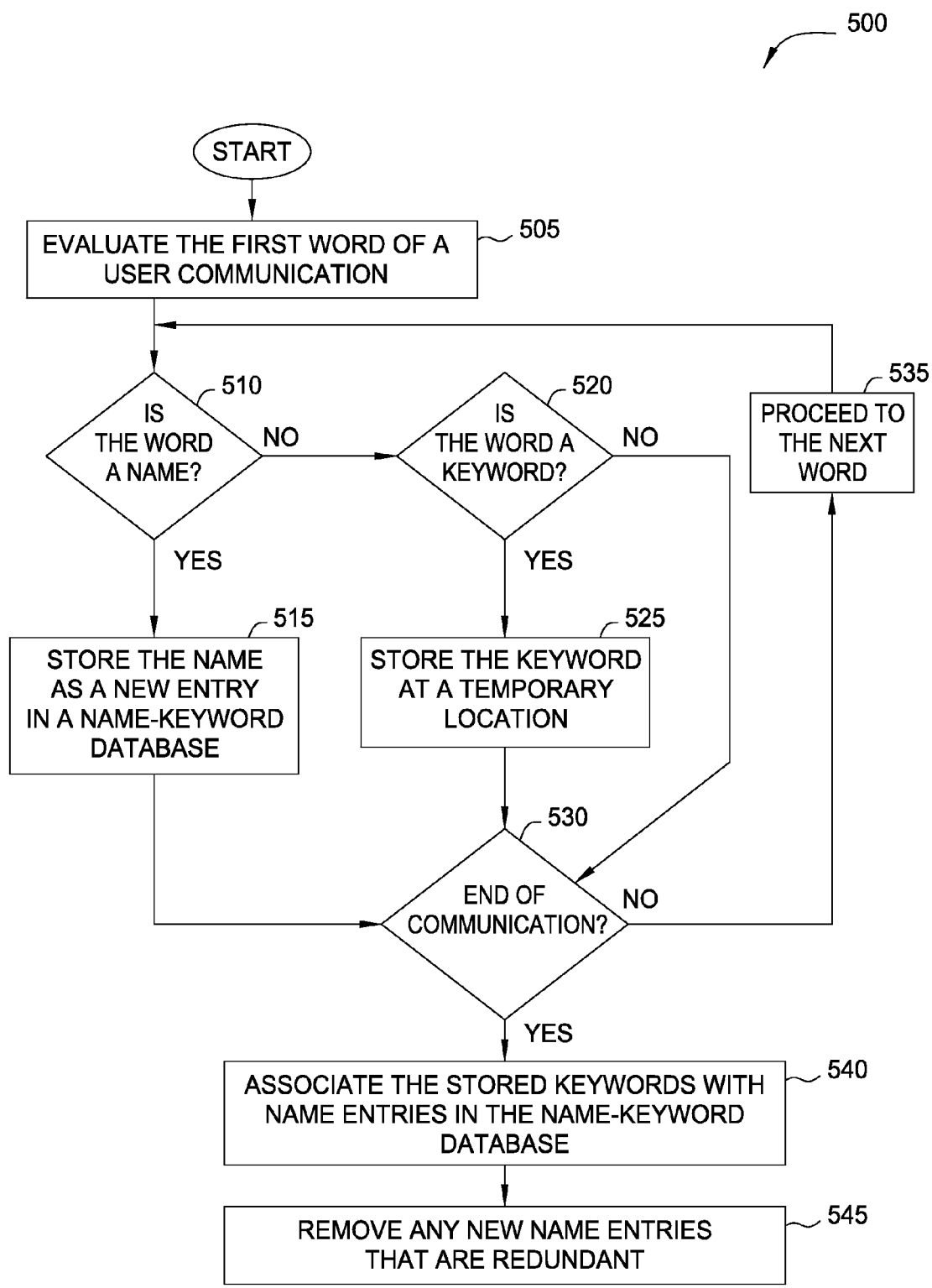
FIG. 5 illustrates a method of populating a name database, according to one embodiment of the invention.

FIG. 5 illustrates a method of populating a name database, according to one embodiment of the invention. Although FIG. 5 illustrates a process of using keywords as the ranking data associated with name entries in a name database 224, one skilled in the art will recognize that a name database may be populated regardless of the type of ranking data chosen.

At step 505, the messaging application 222 evaluates the first word of a user communication such as the one shown in FIG. 4. Alternatively, the messaging application 222 may parse a chat log, approved contact lists, profiles of persons affiliated with the first user 102, previous email conversations, and the like. Further, the messaging application 222 may prompt the first user 102 for names and associated keywords.

At step 510, the messaging application 222 determines if the word is a name. This may be only a first name, only a last name, only a middle name, or some combination of the three. That is, even if the messaging application 222 discovers one name, it may look at subsequent words to see if additional words are a middle or last name. Moreover, the messaging application 222 may determine whether the name is a first name, middle, or last name to aid in making better matches. For example, the first name may appear after the last name. The messaging application 222 may detect this unconventional arrangement and ensure that the correct label is provided when storing the full name in the name database 224. To do this, the messaging application 222 may have access to a list of common first, middle, and last names to compare with the word. In one embodiment, the messaging application 222 compares the word to names found in the first user's 102 trusted or approved contact list associated with the messaging application 222.

In one embodiment, the messaging application 222 may be configured to recognize nick names or aliases. For example, the messaging application 222 may recognize that "Mom" and "Brother" are names that may have associated formal names which are recorded in a separate source (e.g., an approved contact list).

If the word is a name, at step 515 the messaging application 222 may store the name as a new entry in the name database 224 or in temporary storage. Otherwise, at step 520 the messaging application 222 determines if the word is a keyword.

In general, a keyword is any word that characterizes or identifies another word. Specifically, the keyword provides information about the individual represented by a given name (e.g., the person's occupation, education, skills, physical attributes, personality, family status, relationship with the first user 102, etc.). The messaging application 222 may combine multiple keywords to form keyword phrases that may have little meaning if considered separately—e.g., "intellectual property". Moreover, the messaging application 222 may exclude common words such as articles (e.g., "a" and "the") and conjunctions (e.g., "and", "or", and "but"). One skilled in the art of language recognition will appreciate the different methods of identifying words or phrases as keywords.

If the word is a keyword, then the messaging application 222 stores the keyword at step 525. Otherwise, at step 530 the messaging application 222 determines whether it has parsed all the words in the user communication. If not, the messaging application 222 evaluates the next word at step 535 and returns to step 510.

After the messaging application 222 has parsed all the words in the user communication, at step 540 the messaging application 222 associates the stored keywords with new or old name entries in the name database 224, although, in one embodiment, the messaging application 222 may associate keywords with names before parsing the entire user communication. If a user communication includes only one name, the messaging application 222 may be associated all found keywords with that one name. However, when a user communication includes multiple names, the messaging application 222 may have to determine which keywords are associated with which name.

The messaging application 222 may associate keywords to names based on proximity. If a keyword is found within a predetermined distance from a name, the messaging application 222 may assume that the keyword is associated with the name. If a keyword is within the predetermined distance from two names, the messaging application 222 may assign the keyword to the name it is closest to.

The messaging application 222 may associate keywords to names based on keywords already associated with the name. For example, if a name already has "police officer" associated with it, then the keywords "gun safety" found in a user communication along with the name may be also associated with the name because of the relationship between "police officer" and "gun safety". In this manner, the messaging application 222 becomes more intelligent as more keywords are associated with names. Other examples include recognizing acronyms or alternative wordings of previous keywords.

Associating recently found keywords with previously found keywords is not dependent on the name being located in the user communication. For example, if a new found keyword is similar to a plurality of keywords associated with a previously stored name, the messaging application 222 may also associate that new keyword with the previously stored name, regardless if that name was in the user communication. For example, if a name already stored in the name database 224 has the keywords "IT specialist" associate with it and a new user communication uses that phrase "IT network specialist", the messaging application 222 may associate the new phrase with the previously stored name because of the keyword similarities.

Although not shown, the messaging application 222 may fail to associate a found keyword with either a new name (i.e., a new entry) or an old name (i.e., an old entry) in the name database 224. In one embodiment, the messaging application 222 may discard the unaffiliated keywords. In another embodiment, the messaging application 222 may continue the store the keywords to determine if future user communications from the first user provide additional names that may be associated with the keywords.

At step 545, the messaging application 222 removes any new name entries representing a person that is already represented by a name entry in the name database 224—i.e., the new name entries are redundant. After the messaging application 222 finishes parsing the user communication, some of the names stored may have exact duplicates in the name database 224. Though these duplicates may represent different people, the messaging application 222 can determine if the names are associated with similar keywords. For example, if two "Jim Smith" name entries are both associated with "project manager" and "program X", then the messaging application 222 may determine they are redundant entries and delete one. Moreover, if the some of the keywords stored by the redundant name entries are different, then the messaging application 222 may associate those unique keywords with whichever of the name entries that is not deleted.

One of ordinary skill in the art will recognize that different methods of populating a name database and associating ranking data with each name entry. The above embodiment is only one embodiment of populating a name database and associating ranking data.

Using Keywords for Ordering a Plurality of Matched Names

Figure 6:
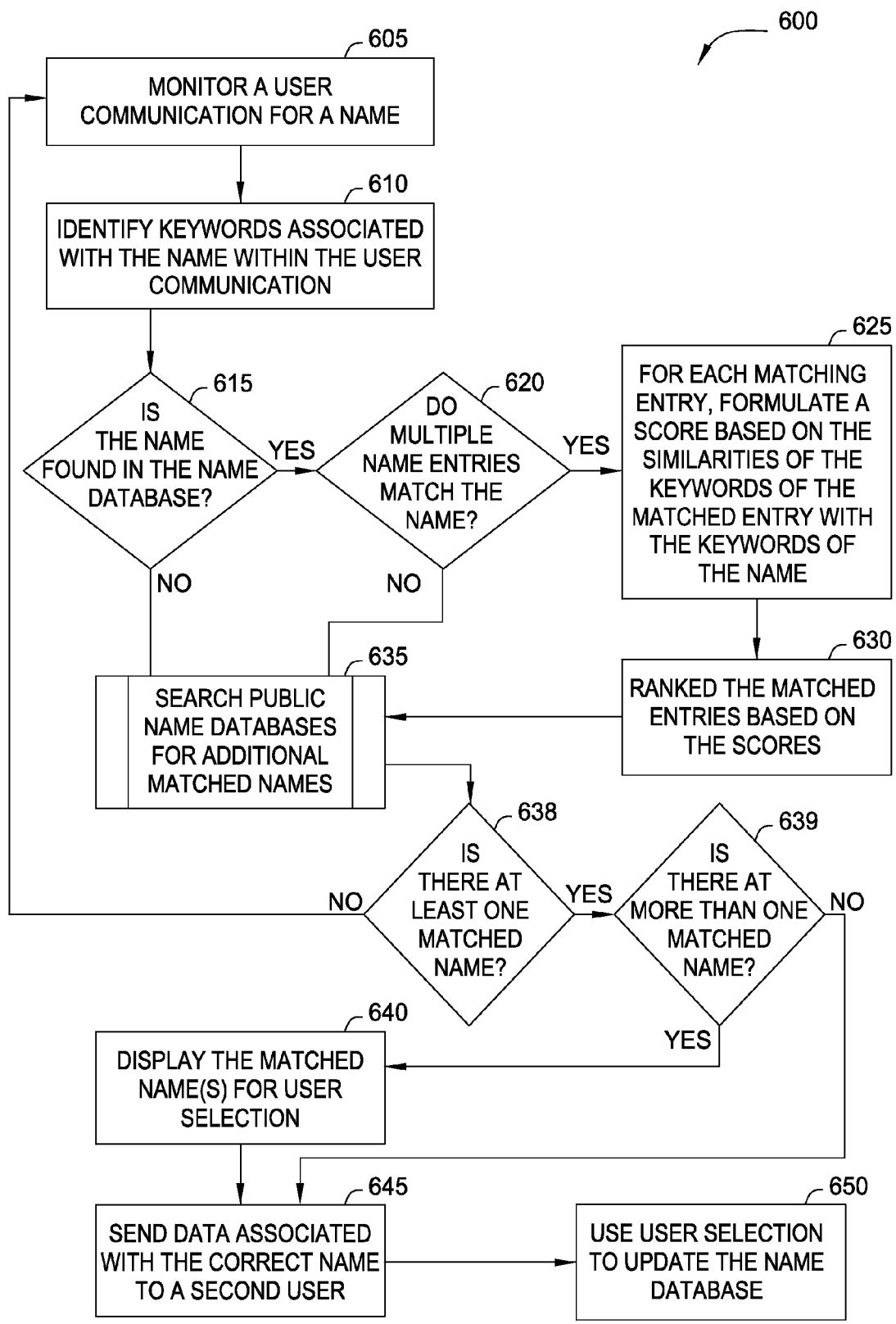
FIG. 6 illustrates a method of sending suggested contacts via a messaging application, according to embodiments of the invention.

FIG. 6 illustrates a method of sending suggested contacts via a messaging application, according to embodiments of the invention. FIG. 6 illustrates a process 600 of using keywords as ranking data to identify and order names. At step 605, the messaging application 222 monitors a user communication to identify a name. This is a similar process as step 302 in FIG. 3 and may use the same techniques discussed at that step.

At step 610, the messaging application 222 identifies keywords associated with any identified names. These keywords may be found and associated with the identified name in a similar way as described at step 520 and 540 of FIG. 5. That is, the messaging application 222 identifies keywords (e.g., distinguishes words that describe a name from common words such as articles) and then associates those keywords with the identified name (e.g., determines if the keywords is within a predetermined proximity of the identified name). After the completion of step 610, the messaging application 222 has at least one identified name and at least one keyword associated with the identified name.

At step 615, the messaging application 222 parses the name database 224 to determine if any of the entries in the database 224 match the identified name. A match can be an exact match, a nickname, a name represented by the identified name (e.g., "Mom" or "My Brother"), or a partial match (e.g., only the last name). If the messaging application 222 finds at least one match, the process 600 continues to step 620.

In one embodiment, if the messaging application 222 finds multiple matches in the name database 224, the matched names are ordered. That is, the messaging application 222 uses the ranking data associated with the matched names (i.e., name entries) in the name database 224 to order the names. In the embodiment illustrated in FIG. 6, the ranking data is one or more keywords associated with each matched name. At step 625, the messaging application 222 formulates a score based on the similarities between the keywords associated with matched names and the one or more keywords associated with the identified name.

The matched names with keywords that are more similar to the keywords of the identified name will have a higher score than matched names with less similar keywords, and thus, a higher rank in the determined order. In one embodiment, the messaging application 222 determines if the keywords for both an identified and matched name are exactly alike. In another embodiment, the messaging application 222 may determine if the keywords are associated with the same topic—e.g., "software updates" and "troubleshooting networks" are both related to Information Technology. Moreover, each keyword may be assigned a weight such that if a related keyword is found in the user communication, that match is given a correspondingly higher or lower score. For example, the messaging application 222 may give more weight when keywords related to a person's occupation are similar to keywords found in a user communication rather than a person's hobbies. On the other hand, the messaging application 222 may subtract from the score if certain keywords associated with a matched name are not found within the user communication. One of ordinary skill will recognize that other methods may be used with the process described here to create a score based on the similarities between keywords.

At step 630, the messaging application 222 uses the score for each of the matched name to order the names.

At step 635, the messaging application 222 may search public name databases for additional matched names. These databases may include phone directories, additional trusted or approved contact lists, websites, and the like. In general, the messaging application 222 searches the public name databases for names and associated keywords that can then be matched with the identified name and keywords found in the user communication. This process is shown in greater detail in FIG. 7.

If the messaging application 222 finds at least one matched name in either the public name databases or the name database 224 (step 638), the process continues to step 639. Otherwise, the process 600 returns to step 605 to identify another name.

In one embodiment, the messaging application 222 may display the names to the first user 102 if there are multiple matched names, else, the messaging application 222 may automatically move to step 645. Omitting displaying the names saves time and system resources. As long as the single matched name is correct, the first user 102 avoids having to manually select the matched name.

In one embodiment, the messaging application 222 always displays the one or more matched names for the first user 102 to select. In this manner, the first user 102 may select a correct name from a list of names or provide the name if none of the displayed names is correct. Even if the messaging application 222 only has one matched name, that name may be incorrect. Displaying all matched names to the first user 102 ensures that the messaging application 222 does not inadvertently send the incorrect contact information to the second user 104. In one embodiment, the messaging application 222 may begin by always displaying the matched name to the first user 102 before moving on to step 645 but then later transition to displaying the names only when there are more than one matched names. This may be preferable when the messaging application 222 is first building the name database 224. After a period of time, the name database 224 may become populated with enough names and associated keywords to confidently omit displaying only a single matched name to the first user 102.

In one embodiment, the messaging application 222 may display one or more names to the first user 102 only if the score or scores are below a threshold value. For example, if there are three match names but one or more have a score above the threshold, the messaging application 222 may omit displaying the matched names for user selection and attach to the user communication the contact information associated with the matched name with the highest score.

At step 640, the messaging application 222 transmits the ordered matched names, which may include additional names found in the public name databases, to the display device 226. The display device 226 then displays the matched names for the user. For example, the matched names 404 shown in FIG. 4 may be presented on the display device 226. The most relevant matched name (i.e., the name with the highest score) may be presented at the top of the list. Alternatively, the scores may be displayed to the user without being ordered. Or the messaging application 222 may highlight or emphasis the matched names with scores above the predetermined threshold score.

Presenting the matched names on the display device 226 permits the first user 102 the chance to select the correct name from the matched names. Ordering the matched names according to relevance of the name to keywords associated with the identified name increases the likelihood that the most relevant name is the first name the first user 102 sees. If the assumption holds that the most relevant name is most likely the correct name, then the first user 102 is able to quickly select the correct name from the matched names.

Moreover, the messaging application 222 may display other identifying information about the matched name that is not used to order the names such as a physical address or user ID. When identified names match to a plurality of matched names that are the exact same, this identifying information (e.g., a street address, alias, or title) would tell the first user 102 which of the matched name represents the correct individual. The messaging application 222 may cause the display device 226 to always display this identifying information or only display the information if at least two matched names are identical. In either case, the identifying information may also be used as keywords to determine an order of the matched names.

After the user first user 102 selects the correct matched name, at step 645, contact information associated with the selected name may be transmitted to the second user 104 or attached to a user communication that will be sent to the second user 104. This step corresponds to step 325 of FIG. 3 and may use any of the methods discussed therein to attach or transmit the associated contact information.

At step 650, the messaging application 222 may use the user selection to update the ordering of the matched names. For example, if the first user 102 selects a name that was not the matched name with the highest score, the messaging application 222 may assign the selected name a higher score to ensure that the next time the identified name appears in the user communication, the matched name is ordered higher. Also, the messaging application 222 may give additional weight to the keywords of the matched name that were similar to the keywords associated with the identified name. Stated differently, some keywords may be more important than others. Determining which keywords did (or did not) lead to placing the correct matched name at the top of the ordered list permits the messaging application 222 to refine how it orders the matched names.

In one embodiment, the messaging application 222 may provide the first user 102 with a chance to correct mistakes within the name database 224, for example, if the name database 224 mistakenly has two name entries for the same individual. This redundancy may occur if individual has two different aliases or if when populating the name database 224 the messaging application 222 mistakenly determined that associated keywords represented two separate individuals.

The process 600 of FIG. 6 may occur simultaneously with the process 500 of FIG. 5. That is, the messaging application 222 may be populating and updating the name database 224 while the messaging application 222 is transmitting contact information associated with selected names to the second user 104.

Searching for Matched Names in Public Name Databases

Figure 7:
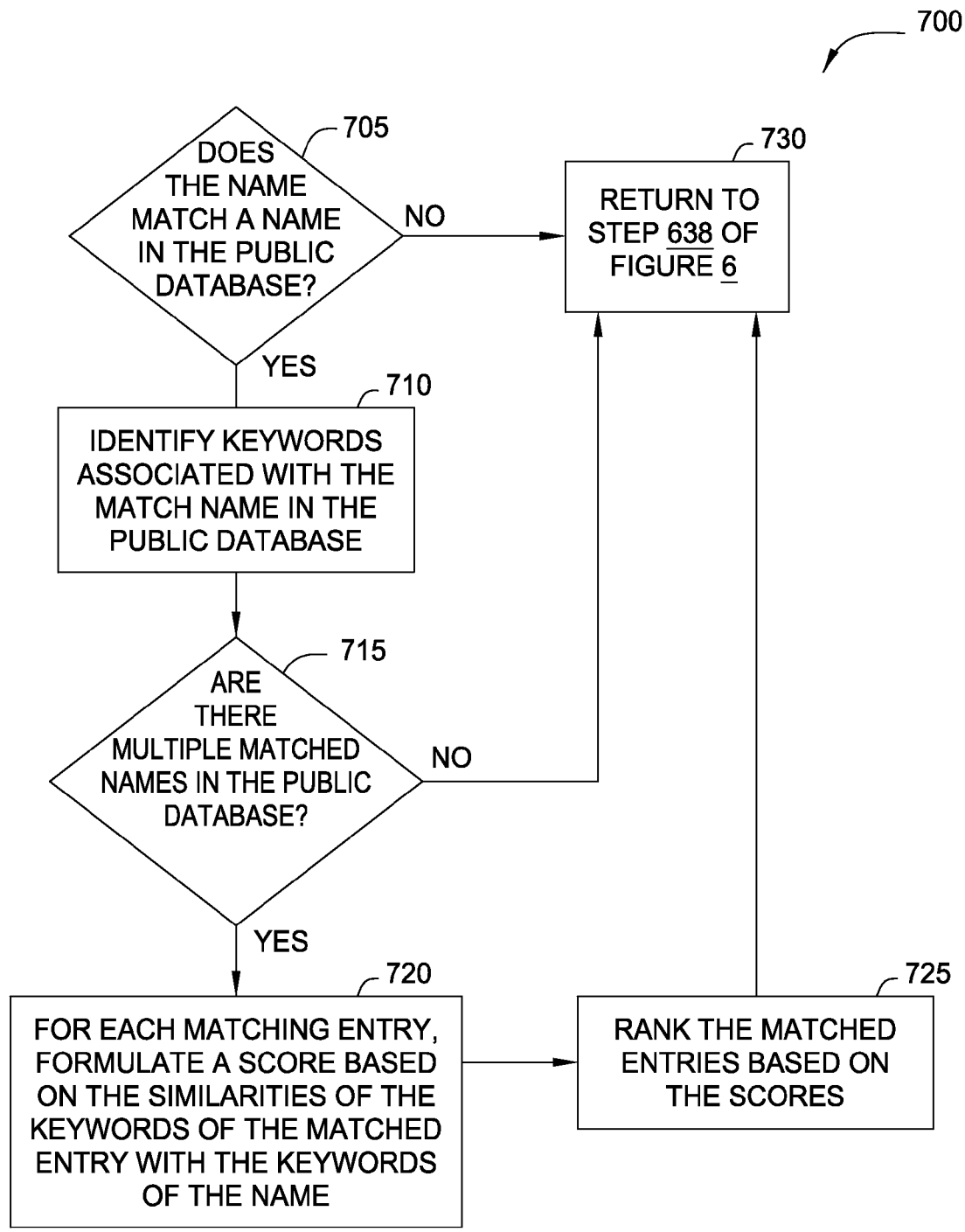
FIG. 7 illustrates a method of sending suggested contacts via a messaging application, according to embodiments of the invention.

FIG. 7 illustrates a method of sending suggested contacts via a messaging application, according to embodiments of the invention. FIG. 7 is an in-depth illustration of step 635 in FIG. 6. At step 705, the messaging application 222 parses a public database for the identified name. The messaging application 222 may search the public database in the same manner that is searches for a matched name in the name database 224. Further, the public database and name database 224 do not have to organize data in the same manner— e.g., public name database may be a object oriented database while the name database 224 is a relational database.

If no names are found, the process 700 returns to step 638 of FIG. 6. Otherwise, the messaging application 222 continues at step 710 to find any keywords associated with the matched names. In one embodiment, even if the messaging application 222 cannot find any ranking data (e.g., keywords) associated with the matched names, it may display the matched name but not order them or place them at the bottom of the list. Additionally, the messaging application 222 may find identifying information that enables the first user 102 to distinguish between each matched name.

If there are multiple matched names, at step 720 the messaging application 222 formulates a score for each match name based on the similarities of the keywords associated with the matched name and the keywords associated with the identified name. This process may use the same techniques for formulating a score that was discussed in step 625 of FIG. 6. In one embodiment, if there are no keywords associated with the identified name, the messaging application 222 may use one of the other methods discussed above, such as the hierarchical organization of a business, to formulate a score.

At step 725, the messaging application 222 orders the matched names based on the score. The messaging application 222 may intermingle the scores of the matched names from the public name databases with the matched names from the name database 224 or order each set of matched names in separate portions in the order list. In one embodiment, the messaging application 222 may assign a greater weight to each score of the matched names found in the name database 224 local to the computer system 110 than to a matched name found in a public name database. This may be preferable if the name database 224 is based on the first user's 102 approved contact list and is thus more likely to include names that are relevant to the first user 102.

After the matched names are ranked, the process 700 returns to step 638 of FIG. 6 for further evaluation.

Suggesting Names Based on Keywords

Figure 8:
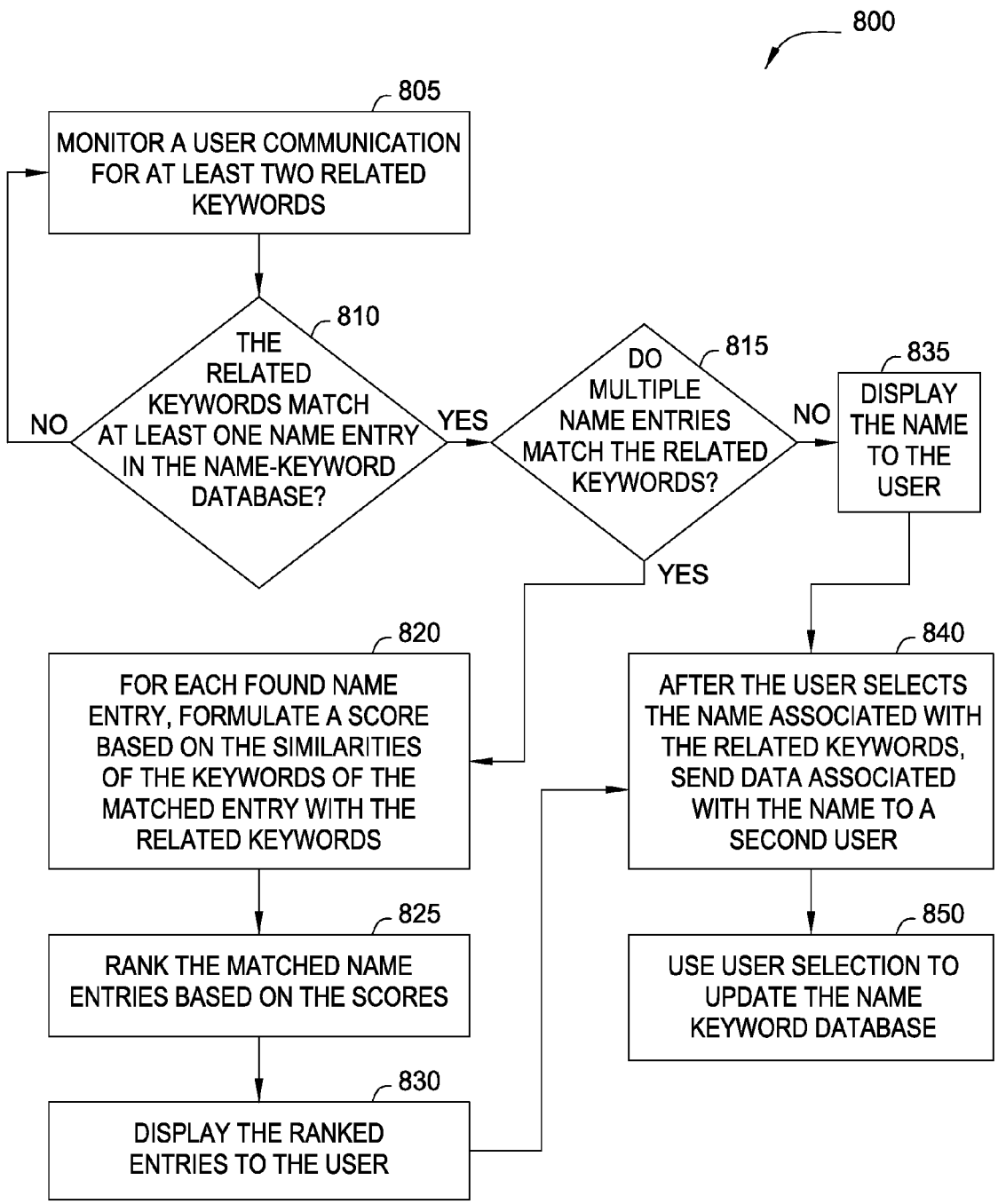
FIG. 8 illustrates a method of sending suggested contacts via a messaging application, according to embodiments of the invention.

FIG. 8 illustrates a method of sending suggested contacts via a messaging application, according to embodiments of the invention. Instead of using an identified name in a user communication, the messaging application 222 identifies at least one keyword in the user communication (hereinafter "identified keywords").

At step 805, the messaging application 222 monitors a user communication for at least one keyword. Specifically, the messaging application 222 identifies keywords that describe a person (who has a name). For example, these keywords may be an occupation, a location, a user ID, a physical description of a person, a historical event, education, relationship with others, and the like.

In one embodiment, the messaging application 222 may associate at least two keywords together. Two keywords in a user communication are related if they likely describe the same individual. This may be done by, for example, if the keywords are within a close proximity (i.e., within a predetermined number of words from each other), if they describe the same topic (e.g., "computer troubleshooting" and "software updates" describe an IT specialist), or are acronyms or alternative wordings of each other.

At step 810, the messaging application 222 parses the keywords associated with the names stored in the name database 224. For example, if both the names and the associated keywords are stored in the name database 224, then the messaging application 222 searches the database 224 for the matching keywords and then stores the corresponding name as a likely individual described by the identified keywords. The more related keywords identified by the messaging application 222, the more likely the matched name list includes the individual described by the keywords. The messaging application 222 may match the identified keywords to the keywords associated with the name entries by, for example, determining if the keywords are identical, if they both relate to the same topic, if they are slight variations of each other (e.g., one is plural while the other is singular), or if they are synonyms, alternative wordings, or acronyms of each other. One of ordinary skill will recognize the variety of ways of determining if two keywords are related. The messaging application 222 may decide that the identified keywords match the keywords associated with a name entry if the similarities exceed a certain threshold or have a certain number of keywords in common.

If the messaging application 222 identifies at least two matched names with similar keywords as the identified keywords, at step 820, the matched names are assigned a score based on the similarities of the identified keywords and the keywords associated with the matched names. This step may be performed by the same techniques disclosed in step 625 of FIG. 6.

After determining a score based on the similarities of keywords, the messaging application 222 orders the matched names according to the score at step 825 and transmits the ordered list to be displayed on the display device 226 at step 830.

If the identified keywords match the keywords associated with only one matched name, then at step 835 the messaging application 222 transmits that name to be displayed. The user can then indicate if the matched name is incorrect and provide the correct name. In one embodiment, the messaging application 222 omits step 835 and automatically attaches or transmits to the second user the contact information associated with the matched name.

At step 840, the messaging application 222 receives the name selected by the first user 102 and transmits or attaches contact information associated with the selected name to the second user 104. This step may use the same techniques described in step 325 of FIG. 3.

Finally, at step 850 the messaging application 222 uses the selected name as feedback to further refine the ordering process as described in step 650 of FIG. 6.

In general, by monitoring a user communication, a messaging application 222 may use information found in the user communication to suggest names to a first user. That user may then select a suggested name to automatically send contact information to a second user so that the second user may easily contact the individual with the selected name.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, the computer program product comprising:
  a non-transitory computer-readable storage medium having computer-readable program code embodied therewith, the computer-readable program code configured to:
    recognize an identifier in a user communication, wherein the identifier describes a person in the user communication;
    identify at least two names in a name database based on the identifier;
    determine an order of the at least two names based on ranking data associated with each of the at least two names, wherein the ranking data comprises at least one of a keyword, a length of time each of the at least two matched names have been stored in the name database, a frequency that one of the at least two matched names matches a name of the person in the user communication, a frequency that one of the at least two names is selected, and a helpfulness rating of each of the at least two names;
    transmit the at least two names to be displayed in the determined order;
    after transmitting the ordered names, receive a selected name that is one of the ordered names; and
    transmit contact information associated with the selected name.

2. The computer program product of claim 1, wherein the identifier is one of (i) the name of the person in the user communication and (ii) at least one keyword that describes the person in the user communication.

3. The computer program product of claim 1, wherein the identifier is the name of the person in the user communication and further comprising recognizing an identifying keyword associated with the name of the person in the user communication.

4. The computer program product of claim 3, further comprising searching a public database for additional names that have associated keywords that match the identifying keyword, wherein the additional names match the name of the person in the user communication.

5. The computer program product of claim 1, wherein the ranking data further comprises at least one of a predetermined score or a structured hierarchy.

6. A system, comprising:
  a computer processor; and
  a memory containing a program that, when executed on the computer processor, transmits contact information, comprising:
    recognizing an identifier in a user communication, wherein the identifier describes a person in the user communication;
    identifying at least two names in a name database based on the identifier;
    determining an order of the at least two names based on ranking data associated with each of the at least two names, wherein the ranking data comprises at least one of a keyword, a length of time each of the at least two matched names have been stored in the name database, a frequency that one of the at least two matched names matches a name of the person in the user communication, a frequency that one of the at least two names is selected, and a helpfulness rating of each of the at least two names;

transmitting the at least two names to be displayed in the determined order;

after transmitting the ordered names, receiving a selected name that is one of the ordered names; and transmitting contact information associated with the selected name.

7. The system of claim 6, wherein the identifier is one of (i) the name of the person and (ii) at least one keyword that describes the person in the user communication.

8. The system of claim 6, wherein the identifier is the name of the person in the user communication and further comprising recognizing an identifying keyword associated with the name of the person in the user communication.

9. The system of claim 8, further comprising searching a public database for additional names that have associated keywords that match the identifying keyword, wherein the additional names match the name of the person in the user communication.

10. The system of claim 6, wherein the ranking data further comprises at least one of a predetermined score or a structured hierarchy.

\* \* \* \* \*